Patented Jan. 16, 1934

1,943,583

UNITED STATES PATENT OFFICE 1,943,583

METHOD OF REFINING LIQUID HYDROCARBONS

Gerald C. Connolly and Albert F. Wurzbacher, Baltimore, Md., assignors, by mesne assignments, to Chester F. Hockley, receiver for The Silica Gel Corporation, Baltimore, Md., a corporation of Maryland No Drawing. Application May 22, 1931
Serial No. 539,408

11 Claims. (Cl. 196—23)

The present invention relates to methods of refining liquid hydrocarbons and more particularly to petroleum and other oils containing gum-forming constituents, for example, cracked distillates, mixtures of cracked distillates with straight-run products, shale oils, and hydrocarbons recovered from coke oven gases.

According to one prior method of refining, these hydrocarbons are first treated with a reagent to form sludge and to polymerize the gum-forming constituents and then, after removal of the sludge, are subjected to an elevated temperature and pressure sufficient to keep the hydrocarbons in the liquid phase, preferably in the presence of a solid porous adsorbent material. Thereafter the polymerized gums are removed from the hydrocarbons by distillation, the hydrocarbons being washed either before or after the distillation, or both before and after.

In this process, just before the adsorbent becomes exhausted, it is reactivated as by heating so that it is revivified and placed in condition for treating more hydrocarbon. A solid adsorbent like silica gel may be used over and over indefinitely in this manner. The reagent, such as an acid, used to treat the hydrocarbon causes gums and sludge to form, the latter being removed by gravity.

In practicing the process outlined above, frequently it is difficult to thoroughly activate the adsorbent without subjecting it to excessively high temperatures after use. This difficulty is attributed to the presence of colloidal sludge not removed by the gravity treatment mentioned above.

It is one of the principal aims of the present invention to remove this colloidal sludge as well as the small quantity of gummy sludge not separated by the settling operation, so that in the subsequent treatment of the oil with a solid adsorbent, the adsorbent may be reactivated or revivified repeatedly without any difficulty or substantial falling off in its efficiency. Furthermore, it is desirable to remove this colloidal sludge for the reason that if it is left in the oil, it will deposit in the heaters and necessitate frequent cleaning.

It is well known in the oil refining industry that water will coagulate and remove colloidal sludge, this procedure being known as the "coking" step. Water, however, has the very decided disadvantage in that it quickly forms an emulsion with the acidulated oil unless great care is exercised. The care and time required in avoiding emulsions is so great that users of the process prefer to speed up the process and to wash the oil without exercising such care, whereby a loss of emulsified oil results.

In practicing the present invention, the beneficial effects resulting from the use of water are obtained without the detrimental effects. The present invention contemplates removing the colloidal sludge by washing with steam effected by introducing steam into the hydrocarbon from which the heavy sludge has already been removed, said hydrocarbon being at a temperature at which the steam will condense into droplets within the body of the oil. By such procedure the suspended and colloidal sludge are caused to coagulate. The condensed steam and coagulated sludge both settle from the oil and may be removed in any suitable manner. The steam should preferably be introduced at a pressure at which it will bubble through the oil rather than at a pressure at which excessive agitation will result.

The thorough removal of colloidal sludge has been found exceedingly advantageous when practiced in conjunction with the herein described processes.

A complete process performed in accordance with the present invention is as follows: A light hydrocarbon of the nature hereinbefore described, preferably at a slightly elevated temperature, is mixed with a reagent capable of forming sludge and of reacting with the gum-forming constituents. The temperature to which the hydrocarbon is heated is dependent upon the type of hydrocarbon being treated. For a cracked gasoline containing light ends, the temperature should be quite low so as to prevent volatilization. For higher boiling hydrocarbons, the temperature may be correspondingly higher. The oil-acid mixture is preferably maintained in a heated condition in order to reduce the amount of acid required. A warm oil will react much more readily with a given amount of acid than a cold oil. The control of the temperature permits feeding into the oil of a constant and small quantity of acid. If preheating is practiced, the temperature during the acid treatment is preferably maintained at about 70° to 120° F.

The reagent employed for reacting with the impurities to form a sludge and for polymerizing the gum-forming constituents, may be any suitable acid, such as sulphuric, hydrochloric, or acetic, or an acid-yielding salt or compound, such as aluminum chloride or dimethyl sulphate. It is preferred to employ sulphuric acid of any suitable concentration, preferably 80% to 93.5% strength.

Where an acid of this strength is employed the quantity required is about 0.2% to 1%, preferably 0.3% to 0.5% of the weight of the hydrocarbon being treated. This small quantity of acid reacts with the more easily polymerized unsaturates and does not appreciably affect the more valuable unsaturated hydrocarbons. If desired, the acidulation of the oil may be effected in two steps, the first consisting in adding about one third of the total amount of acid to take up the water present in the oil, and the second to bring about the true acidulation, that is, to cause the gums and sludge to form. With this treatment the oil darkens considerably. As an alternative procedure, the drying step may be accomplished by the use of a solid porous hydrophilic adsorbent like silica gel, in which case the oil is preferably passed through a bed of adsorbent before effecting the heating step mentioned above.

The thus treated hydrocarbon is settled preferably under warm conditions, such as at a temperature around 100° F. The major portion of the heavy sludge is thereby separated by gravity.

The remaining sludge is then removed either by bubbling a small amount of steam therethrough or by injecting steam into a flowing stream of the hydrocarbon leading to a settling tank. The quantity of steam is dependent upon the nature of the hydrocarbon and sludge and on the quantity of sludge therein and therefore must be determined by experiment in each case. Generally, however, one per cent (considered as water) of the volume of hydrocarbon treated is sufficient to give complete separation. The temperature of the oil during such treatment may be any temperature at which the steam will condense within the body of the hydrocarbon. The condensed steam settles through the hydrocarbon in the form of minute droplets of water and drags the colloidal sludge with it. Normally a settling period of one hour is sufficient.

After separation of the colloidal sludge, the hydrocarbon may be subjected to any one of the three following treatments:

Method 1

The hydrocarbon from which all sludge has been removed is heated at an elevated temperature and at a pressure sufficient to maintain it in the liquid phase. The temperature to which the hydrocarbon is heated depends upon the kind and type of hydrocarbon and the treatment to which it has been subjected in polymerizing the gum-forming constituents. Where acid is employed, the temperature to which the hydrocarbon is raised depends upon the relative amount and strength of the acid. Generally speaking, the greater the amount and strength of the acid the lower the temperature to which the oil is subjected in the digester. If the oil has been treated with a relatively large quantity of acid or with acid of a very high concentration, care must be taken not to subject it to high temperatures, since under these conditions there is a tendency for the oil to become burnt. An oil which has been acidulated with a small quantity of acid or with acid of a lower concentration may be heated to a higher temperature than the foregoing. To give some idea of the temperatures employed, for one kind of oil a temperature of 500° F. is required, whereas for other oils a temperature as low as 150° F. suffices. Generally speaking, the temperatures which are used in the most instances lie between 200° and 325° F.

As stated, the hydrocarbon is maintained at such a pressure as to just keep practically all of the oil in the liquid phase. The pressure depends upon the kind and type of oil being treated and the temperature. For example, for a coke oven light oil containing 90% of a fraction boiling below 200° C. and having a distillation range of 78° to 260° C., the pressure required is 80 pounds per square inch at a temperature of 275° F. At 500° F. the pressure required is 1600 pounds per square inch. The length of time that the oil is subjected to the elevated temperature and pressure varies with the different kinds and types of oils, the degree of acidulation, the substance employed to polymerize the gums, and the temperature to which it is heated. Some oils may be subjected to an elevated temperature for several hours, whereas others should not be treated this way for more than a few minutes. One or two experiments will indicate the proper temperature and length of time.

After the above treatment is complete, the hydrocarbon is cooled to about atmospheric temperature and then distilled, or washed and then distilled. The purpose of the distillation is to remove the polymerized gums. If washing prior to distilling is desired, either water or sodium hydroxide or both may be employed. Also the condensed distillate may be washed in the same manner.

Method 2

The hydrocarbon, after removal of the colloidal sludge, is subjected to heat and pressure in the presence of a hard porous adsorbent material like silica gel which may have associated therewith substances having an affinity for sulphur, such as copper oxide or iron oxide. The temperature is preferably within the range of 250° to 500° F., and the pressure is just sufficient to maintain the hydrocarbon in the liquid phase. As adsorbent material, there may be employed dried hydrous oxides as silica, tungstia, alumina, or stannia, or other adsorbents as bauxite, fuller's earth, bentonite, charcoal, or adsorbent clays.

In the above treatment, some of the gum or acid-hydrocarbon reaction products in solution in the oil deposit on the gel or other adsorbent, and the remaining gum-forming constituents are polymerized by contact therewith. The gums so formed are separated from the treated oil either by distillation or a subsequent treatment with an adsorbent at normal temperature and pressure, after which the oil is cooled and treated as described in connection with the preceding process.

After the adsorbent material has been used for some time, it is necessary to revivify or reactivate it before again employing it in the process. Usually this is accomplished in two steps. In the first, the substances adsorbed by the gel are distilled out by treatment with steam or a non-oxidizing gas, the temperature being sufficiently elevated to volatilize the desirable adsorbed constituents. In the second step, the gel may be heated as high as 1100° F. in the presence of air to oxidize carbonaceous matter not removed by the first step.

Heretofore in treating some oils, the efficiency of the gel after repeated activations has become somewhat lessened. This loss of efficiency is eliminated in the present instance because of the complete removal of both the gummy and colloidal sludge. It is found that the adsorbent such as silica gel, either plain or impregnated with oxides, can be repeatedly activated without any substantial loss of efficiency.

*Method 3*

The hydrocarbon from which the sludge has been completely removed is treated with a porous adsorbent of the nature described above, at normal or atmospheric temperature. This treatment removes the polymerized gums and also any substances like sulphur which, being in solution in the oil, were not taken out by the previous steps of the process. After the adsorbent becomes exhausted, it is activated in the manner previously described. After this treatment with the adsorbent material, the hydrocarbon may be distilled or washed and then distilled in the same manner as described above.

With reference to methods 1 and 2, it is to be noted that the hydrocarbon, immediately after being subjected to the heat and pressure treatment, is dark or even black in color and of an acidic character. The free acidity of the treated hydrocarbon usually varies from .01% to .06% sulphuric acid when the hydrocarbon has been treated with approximately .3% by weight of 66° Bé. sulphuric acid. In other words, the oil at this point in the process remains unneutralized and non-decolorized.

If the hydrocarbon contains any substantial amount of unsaturated hydrocarbons, it is preferred to use water as the washing liquid when washing the refined distillate, since, where sodium hydroxide is employed with oils of this type, the traces of sodium hydroxide left in the oil affect the color and increase the gum content of the oil after it has been in storage for a time.

Having thus described the invention, what is claimed as new and desired to be secured by Letters Patent is:

1. The process of removing colloidal sludge from acid treated liquid hydrocarbons comprising, introducing steam into direct contact with such hydrocarbon at a temperature at which said steam condenses and settling out the condensed steam and sludge collected thereby.

2. In refining liquid hydrocarbons, the steps comprising, treating said hydrocarbon at a slightly elevated temperature with an agent to form a sludge, separating the heavy sludge, introducing steam into direct contact with said treated hydrocarbon at a temperature at which said steam condenses, and settling out the condensed steam and remaining sludge collected thereby.

3. In refining liquid hydrocarbons, the steps comprising, drying said hydrocarbon, treating it with an agent adapted to form a sludge, separating the heavy sludge and removing the remaining suspended sludge by introducing steam into direct contact with said treated hydrocarbon at a temperature at which said steam condenses, and settling out the condensed steam and remaining sludge collected thereby.

4. A process in accordance with claim 3 wherein the drying is effected by contacting the hydrocarbon with a solid porous hydrophilic adsorbent.

5. The method of refining liquid hydrocarbons comprising treating said hydrocarbon with an agent to polymerize gum forming constituents and to form a sludge, separating the heavy sludge, introducing steam into direct contact with said treated hydrocarbon at a temperature at which steam condenses, separating condensed steam and coagulated sludge from the hydrocarbon by gravity, heating said partially purified hydrocarbon at an elevated temperature and pressure sufficient to maintain said hydrocarbon in the liquid phase and separating the purified hydrocarbon from the polymerized gums.

6. The method of refining light hydrocarbons comprising, treating such hydrocarbons with a reagent in a quantity sufficient to form a sludge and to polymerize gum forming constituents in said hydrocarbon, removing the heavy sludge, introducing steam into direct contact with said hydrocarbon at a temperature at which steam introduced condenses, separating the condensed steam and the remaining sludge coagulated thereby by gravity, treating the partially purified hydrocarbon with a solid porous adsorbent, and distilling the purified hydrocarbon from the impurities therein.

7. The method of refining light hydrocarbons comprising, treating such hydrocarbons with a reagent in a quantity sufficient to form a sludge and to polymerize a portion only of the gum forming constituents in said hydrocarbon, removing the heavy sludge, introducing steam into direct contact with said hydrocarbon at a temperature at which steam introduced condenses, separating the condensed steam and the remaining sludge coagulated thereby by gravity, treating the partially purified hydrocarbon with a solid porous adsorbent at an elevated temperature and pressure whereby the remaining gum forming constituents are polymerized and separating the purified hydrocarbon from the polymerized gums.

8. A process in accordance with claim 7 wherein the purified hydrocarbon is separated from the polymerized gums by distillation.

9. The method of refining liquid hydrocarbons comprising, treating the hydrocarbon with a reagent to form a sludge and to polymerize readily reactive gum forming constituents, removing the heavy sludge, introducing steam into direct contact with said hydrocarbon at a temperature at which said steam condenses, settling out and removing condensed steam and colloidal sludge coagulated by said steam treatment, treating said partially purified hydrocarbon with a solid porous adsorbent having at least one metallic oxide associated therewith at an elevated temperature and pressure sufficient to keep the hydrocarbon in the liquid phase and separating the treated hydrocarbon from the gums polymerized in said foregoing treatment.

10. A process in accordance with claim 9 wherein said adsorbent is silica gel.

11. A process in accordance with claim 9 wherein said treated hydrocarbon is distilled from the polymerized gums.

GERALD C. CONNOLLY.
ALBERT F. WURZBACHER.